Jan. 19, 1937. E. R. PFAFF 2,068,110
TUNING DIAL
Filed Dec. 30, 1932
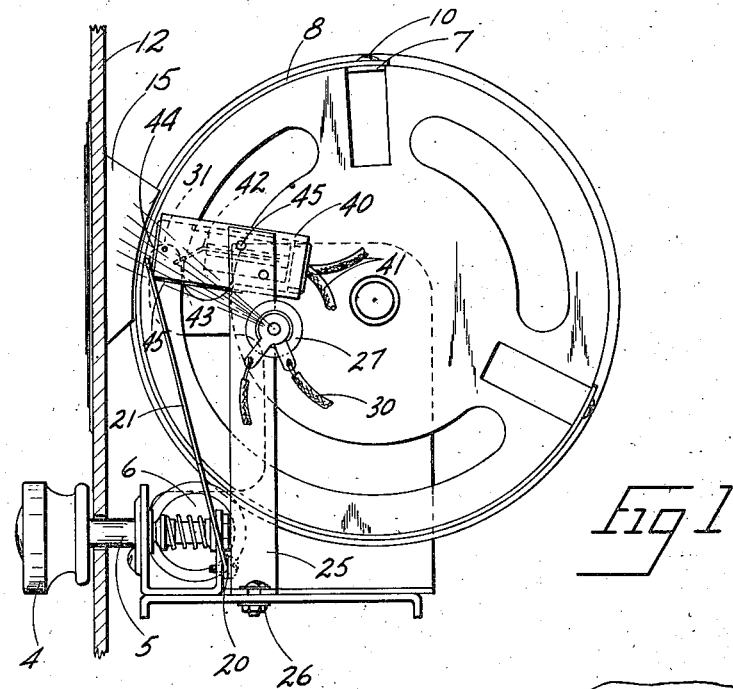
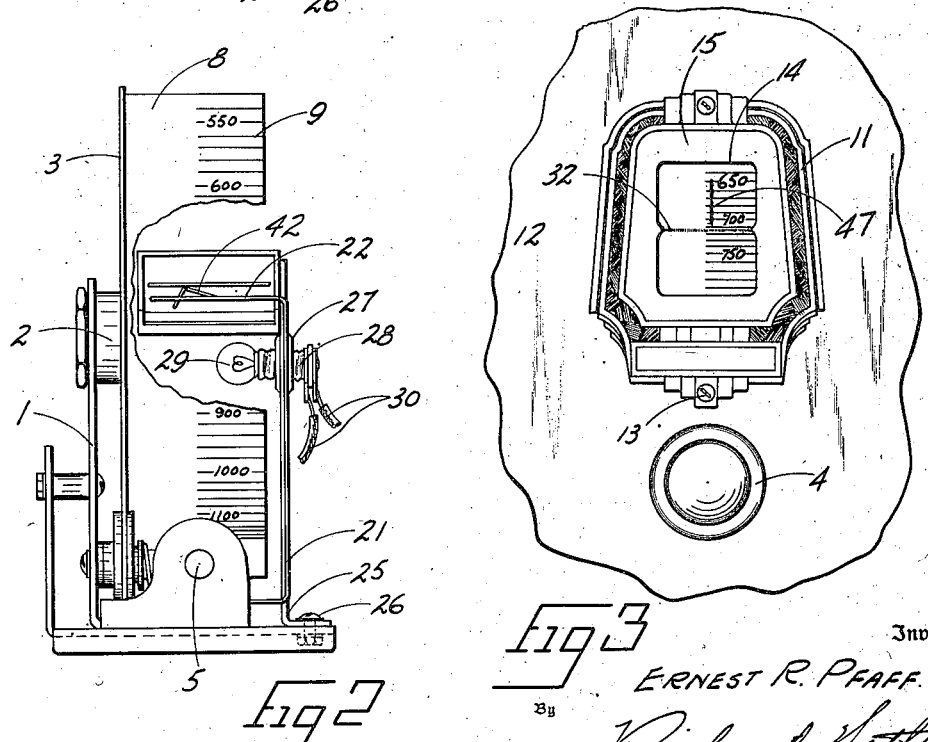
Inventor
ERNEST R. PFAFF.
By
Richey & Watts
Attorney Patented Jan. 19, 1937

2,068,110

UNITED STATES PATENT OFFICE 2,068,110

TUNING DIAL

Ernest R. Pfaff, Chicago, Ill., assignor to
E. H. Scott

Application December 30, 1932, Serial No. 649,476

16 Claims. (Cl. 250—40)

This invention relates to improvements in radio receiving apparatus, and more particularly to an improved indicator for indicating the wavelength to which the receiver is tuned and for indicating that the receiver is tuned to maximum resonance with an incoming signal.

In radio receivers it has been common practice to provide a calibrated dial connected to a tuning instrument such as a condenser or a series of condensers or the like to indicate the wavelength to which the receiver is tuned. The dial is usually calibrated in kilocycles or meters but in some instances may be an arbitrary calibration. It is also common practice in tuning receivers to provide a separate instrument to indicate when the receiver is tuned to resonance. This instrument usually comprises an electric measuring instrument which is coupled into the radio receiver circuit in such a manner that an indicator on the instrument, usually a swinging arm or hand, is swung by the current produced in the receiver by the incoming signal. When so connected the point where the instrument shows the greatest hand swing indicates the maximum current and is the point at which the set is tuned most perfectly to the incoming signal. This eliminates guesswork based on the ear of the operator as to when the receiver is properly tuned to a signal. These two functions, namely knowing what wavelength the receiver is tuned to and when it is properly tuned in to a signal, in a radio receiver have always been accomplished by two separate and distinct indicators and it is necessary for the operator to observe separate instruments disposed on the radio receiver panel.

It is desirable in modern radios, which are to be used in the home, to provide a radio which blends with the rest of the furnishings and to eliminate therefrom all unnecessary and mechanical appearance. It is also desirable in producing a radio receiver to provide a receiver which is easy to tune and requires a minimum number of dials and apparatus to be operated in order to properly receive an incoming signal. A profusion of indicators and dials is always confusing to the average listener, particularly those who have little or no idea of what is going on in a radio receiver. It is also desirable to provide simplicity in appearance of the receiver.

It is therefore the purpose of this invention to provide an improved tuning indicating apparatus in which the design of a radio panel, tuning and apparatus thereon lends itself to simplicity, compactness, and where facility in tuning is accomplished. By the invention as disclosed herein it has been possible to simplify the structures of the prior art and to consolidate the parts into a compact indicating device which still retains all the functions of the prior art without the disadvantages thereof.

This invention in accomplishing the foregoing and eliminating the defects of the prior art, comprises generally in combining the indicator for designating the wavelength and the indicator for designating the resonance into a single instrument. The invention and the mode of carrying out the invention will become more apparent from the following description of an embodiment thereof which together with the accompanying drawing comprises this specification.

In the drawing:

Figure 1 is a side elevational view of a radio tuning dial together with the other appurtenances forming the invention, a portion of the front panel of the receiver being shown in section;

Figure 2 is a front elevational view of the tuning dial separated from the panel, a portion being broken away to show the elements in the rear; and Figure 3 is a fragmentary elevational view of a radio panel showing the control knob, escutcheon plate and the improved dial therefor.

Referring to the figures of the drawing, throughout which like parts have been designated by like reference characters, there has been illustrated a tuning dial which comprises generally a supporting frame or bracket 1. A hub 2 is rotatably journalled in the frame radially and is provided with an extending flange 3. The hub is adapted to be rotated by a control knob 4 disposed on a shaft 5 through a mechanical connection 6 with the edge of the flange 3 such as is shown and described in the application of George Roethel, Jr., filed October 26, 1932, Serial No. 639,729.

Supported upon the flange 3 is a drum type dial 8 which may be calibrated as at 9 with kilocycle markings, wavelength markings, or any other arbitrary divisions desired for indicating the degree of rotation of the tuning instrument or the wavelength to which the receiver is tuned. In the embodiment shown the material of the drum, which may be secured to lugs 7 on the flange 3 by screws 10, is preferably formed of a translucent material through which light may pass.

The dial illustrated herein is adapted to be rotatable behind an escutcheon plate 11 which is secured to the front panel 12 or the like of the radio set by screws 13. The escutcheon is formed with a suitable window 14 which has re-entrant walls 15 of such conformation as to lie adjacent to the dial as best shown in Figures 1 and 3.

Although I have shown the drum type dial as illustrative of the invention, it is to be understood that the invention may be used with other types of dials and it is not my purpose to limit the same to the drum type dial only.

Secured to the frame 1 by a screw 20 is an upwardly extending member 21 which is provided with a horizontal arm 22 adapted to extend horizontally behind the surface of the dial and contiguous thereto.

A light source is provided for casting light rays on the inner surface of the dial and may generally comprise any suitable type of incandescent bulb so supported that the light rays shine upon the horizontal arm 22 and the inner surface of the dial. In the illustration there has been provided an upwardly extending support 25 which is bolted to the frame at 26. The support extends past the edge of the dial upwardly. A light mounting 27 is secured to this support and in this instance comprises an insulated mounting which carries a miniature light base 28 in which a miniature incandescent light 29 is disposed. Suitable connecting wires 30 are provided for connecting the same to a source of current within the receiver, not shown.

As best shown in Figure 1 the light is so disposed that the rays from the light, indicated by the dotted lines 31, fall upon the dial and upon stationary horizontal arm 22 which casts a horizontal shadow upon the dial as indicated at 32 in Figure 3. The shadow remaining stationary, the dial may be rotated and the shadow is visible on the surface through the window and indicates definitely the degree of rotation or the wavelength to which the receiver is tuned.

The upper end of the arm 25 supports an electrical current measuring instrument 40. The construction per se of the electrical measuring instrument does not form a part of this invention except as modified to fulfill the purpose herein disclosed and may comprise the usual solenoid adapted to actuate a swinging arm by current flowing through the solenoid. The instrument is connected into the receiver circuit by electric conduits 41 in such a manner that when the receiver is tuned to an incoming signal, the signal causes currents to be set up within the circuit, such as a plate current, which flows through the solenoid to cause the moveable hand or member 42 to be swung. The greater the amount of current the greater the swing of the member 42, and when tuning to an incoming signal, the greatest swing of the hand indicates the most exact tuning to resonance of that signal because it is at that position that the most current is being generated in the circuit.

The hand 42 in the modification shown is bent downwardly to provide an arm 43. The adjacent walls of the measuring instrument 44 and 45 are formed of a transparent material such as glass, pyroxylin, or the like, and the instrument which is riveted at 45 to the extremity of the support 25 is so positioned that the rays 31 from the light 29 shine through the transparent walls. The member 43 being interposed between the light source and the dial casts a vertical shadow upon the dial as shown at 47.

In the embodiment shown, the instrument has been described as having the adjacent walls transparent but it will also be apparent that a similar effect could be obtained by disposing the measuring instrument at other angles so that it might be unnecessary to bend the hand to interpose it between the light source and the dial.

However, with the device constructed as shown the position of the swingable hand is such that the shadow 47 on the dial during operation describes a substantially horizontal path across the dial rather than an arcuate path; this is highly desirable.

The result is that a tuning indicator is provided which when being used in conjunction with the tuning elements of a radio receiver provides a visual effect substantially as shown in Figure 3. The horizontal shadow provided by the stationary arm indicates the kilocycle tuning or the like; the vertical horizontally swingable shadow, which moves across the dial in a horizontal path, at the greatest portion of its movement indicates that the receiver is tuned to the greatest resonance. This permits the operator to know simultaneously the wavelength to which his receiver is tuned and that the receiver is tuned to greatest resonance. This eliminates the usual guesswork as to when a set is most perfectly tuned; and provides the same in an extremely compact and unitary manner together with the desirable simplicity in construction.

Having thus described the invention, I am aware that numerous and extensive departures may be made therefrom but without departing from the scope of the present invention.

What is claimed is:

1. In combination with a radio receiver, an indicator therefor, comprising a dial, means for indicating the wavelength on the dial to which the receiver is tuned including a light source and means interposed between the light source and the dial for casting a shadow on the dial, means for indicating that the receiver is tuned to resonance interposed between the light source and the dial to cast a shadow on the dial.

2. In combination with a radio receiver, an indicator therefor including an escutcheon plate formed to provide a window therein, a calibrated dial visible through said window, a light source, means interposed between the dial and the light source for casting shadows on the dial to indicate the wave length and tuning to resonance of the receiver.

3. In combination with a radio receiver, an indicator therefor comprising a translucent calibrated dial, a light source behind the dial, means interposed between the light source and the dial for casting shadows on the dial visible through the dial for indicating the tuning to wavelength and resonance of the receiver to a signal.

4. In combination with a radio receiver a tuning indicator therefor comprising a translucent calibrated drum dial, a light source behind the dial, means interposed between the light source and the dial for casting shadows on the dial visible through the dial for indicating the tuning to wavelength and resonance of the receiver to a signal.

5. In combination with a radio receiver, a tuning indicator therefor comprising a dial, a light source, a horizontal arm disposed between the light source and the dial for casting a horizontal shadow on the dial to indicate the wavelength to which the receiver is tuned, a vertical arm disposed between the light source and the dial to cast a vertical shadow on the dial to indicate the tuning to resonance of the receiver.

6. In combination with a radio receiver, a tuning indicator therefor comprising a calibrated dial, a light source behind the dial, a stationary arm disposed between the light source and the dial for casting a horizontal shadow on the dial for indicating the wavelength to which the receiver is tuned, a movable arm interposed between the dial and the light source for casting a vertical movable shadow on the dial to indicate when the receiver is tuned to resonance.

7. In combination with a radio receiver, a tuning indicator therefor comprising a calibrated dial, a light source behind the dial, a stationary arm disposed between the light source and the dial for casting a shadow on the dial visible through the dial for indicating the wave length to which the receiver is tuned, a movable arm interposed between the dial and the light source for casting a movable shadow on the dial visible through the dial to indicate when the receiver is tuned to resonance.

8. A tuning indicator for a radio receiver comprising a translucent calibrated drum dial, a light source behind the dial adapted to illuminate the dial through the dial, a stationary arm interposed between the dial and the light source to cast a stationary shadow on the dial to indicate the setting of the dial, an arm adapted to be moved by signals received by the receiver interposed between the light source and the dial for casting a movable shadow on the dial visible through the dial to indicate when the receiver is tuned to greatest resonance with an incoming signal.

9. In a tuning indicator for radio receivers, a panel for the receiver an escutcheon plate on the panel formed to provide a single opening therethrough, a translucent drum type calibrated dial rotatable adjacent said window and visible therethrough, a light source within said drum and visible therethrough, a stationary arm interposed between said light source and the dial adapted to cast a shadow on the dial visible through the dial for indicating the wavelength to which said receiver is tuned, a movable arm adapted to be moved by signals received in the receiver, interposed between the light source and the dial and adapted to cast a movable shadow on the dial for indicating when the receiver is tuned to greatest resonance with the incoming signal.

10. In a tuning indicator for radio receivers comprising an escutcheon plate formed to provide a window, a translucent calibrated drum type dial rotatable adjacent to the window and visible therethrough, a light source visible through the window and dial, a stationary member interposed between the light source and the dial adapted to cast a stationary horizontal shadow across the dial for indicating the position of a tuning instrument connected to the dial, a signal operated indicating instrument having a movable member interposed between the light source and the dial adapted to cast a movable vertical shadow on the dial visible through the dial for indicating when the receiver is tuned to greatest resonance with an incoming signal.

11. In a tuning indicator for radio receivers comprising an escutcheon plate formed to provide a window, a translucent calibrated drum type dial rotatably adjacent to the window and visible therethrough, a light source visible through the window and dial, a stationary member interposed between the light source and the dial adapted to cast a stationary horizontal shadow across the dial for indicating the position of a tuning instrument connected to the dial, a signal operated indicating instrument having a movable member interposed between the light source and the dial adapted to cast a movable vertical shadow movable transversely across the dial and visible through the dial for indicating when the receiver is tuned to greatest resonance with an incoming signal.

12. In a tuning indicator for radio receivers comprising an escutcheon plate formed to provide a single window therein, a translucent calibrated drum dial rotatable adjacent to the window and visible therethrough, a light source supported within the drum, a stationary member disposed within the drum adjacent to the inner wall of the drum and adapted to cast a horizontal shadow on the drum, an electrical measuring instrument disposed within the drum and having a movable member interposed between the light source and the drum adapted to cast a vertical shadow on the drum, said movable member being electrically connected into the receiver circuit to indicate maximum resonance to a radio signal.

13. In a tuning indicator for radio receivers comprising an escutcheon plate formed to provide a single window therein, a translucent calibrated drum dial rotatable adjacent to the window and visible therethrough, a light source supported within the drum, a stationary member disposed within the drum adjacent to the inner wall of the drum and adapted to cast a horizontal shadow on the drum, an electrical current measuring instrument disposed within the drum and comprising a casing, a movable member within the casing, means to operate the movable member connected into the receiver circuit, the walls of the casing between the light source and the drum being transparent to permit the movable member within the casing to cast a shadow on the drum.

14. In combination with a radio receiver, an indicator therefor including an escutcheon plate formed to provide an opening therein, a calibrated dial rotatable behind said opening, a light source, means interposed between the dial and the light source for casting shadows visible through the opening to indicate the wave length and tuning to resonance of the receiver.

15. In combination with a radio receiver, an indicator therefor including an escutcheon plate formed to provide an opening therein, a calibrated dial rotatable behind the opening, a light source, means interposed between the dial and the light source for casting shadows on the dial to indicate the wave length and tuning to resonance of the receiver.

16. In combination with a radio receiver, an indicator therefor comprising a manually operated tuning dial having station indicating calibrations thereon, a light source, means operable by a signal in the receiver interposed between the light source and the dial to indicate resonance of the receiver on the dial.

ERNEST R. PFAFF.